(No Model.)
C. J. VAN DEPOELE.
PULSATING CURRENT ELECTRIC MOTOR.
No. 450,544. Patented Apr. 14, 1891.
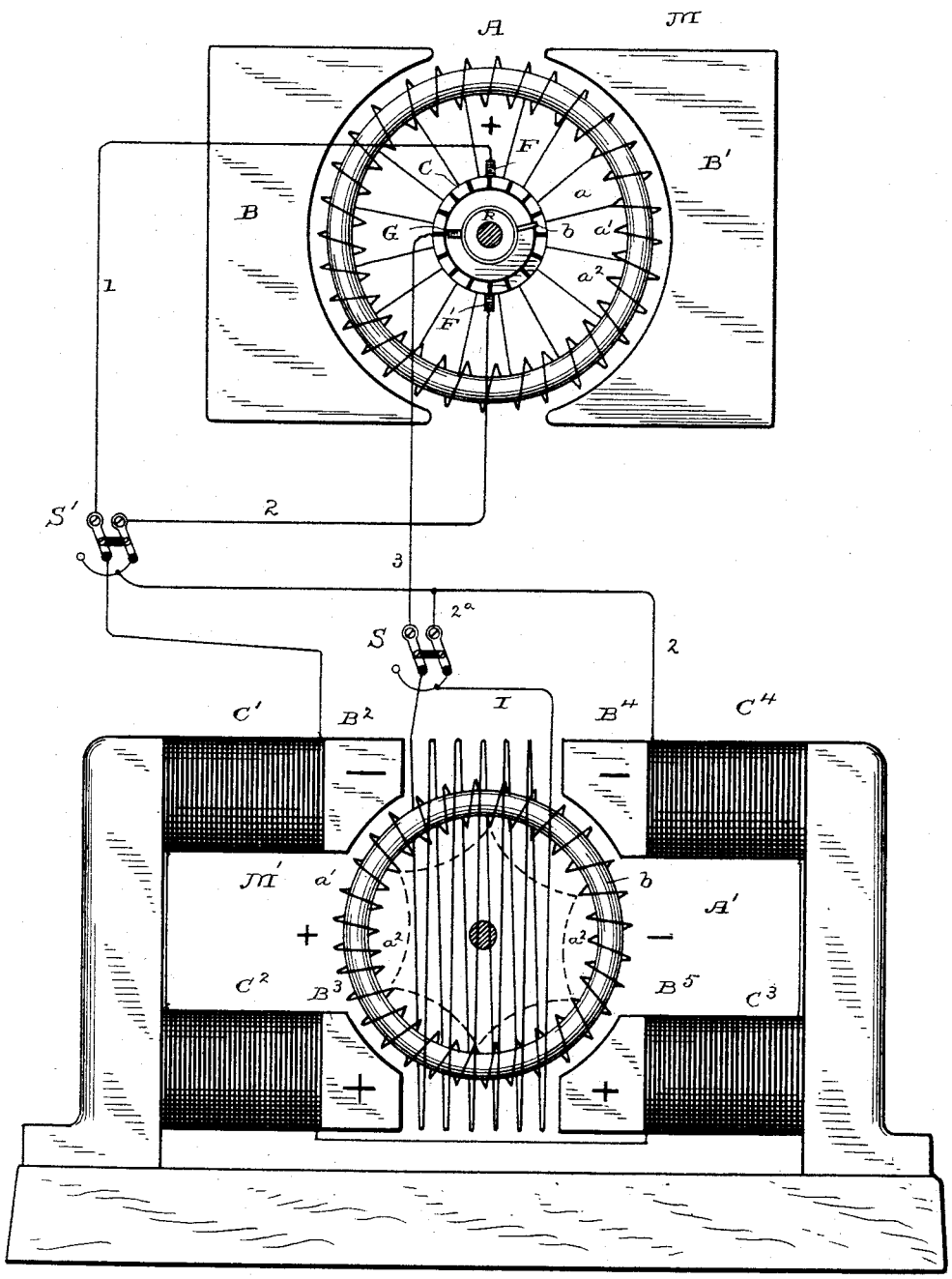
Witnesses
H. A. Lantz
Stephen Jamnus
Inventor
Charles J. VanDepoele
By Frankland Jamnus
Attorney

UNITED STATES PATENT OFFICE.

CHARLES J. VAN DEPOELE, OF LYNN, MASSACHUSETTS.

PULSATING-CURRENT ELECTRIC MOTOR.

SPECIFICATION forming part of Letters Patent No. 450,544, dated April 14, 1891.

Original application filed May 26, 1890, Serial No. 353,247. Divided and this application filed December 29, 1890. Serial No. 376,104. (No model.)

*To all whom it may concern:*

Be it known that I, CHARLES J. VAN DE-POELE, a citizen of the United States, residing at Lynn, in the county of Essex and State of Massachusetts, have invented certain new and useful Improvements in Pulsating-Current Electric Motors, of which the following is a description, reference being had to the accompanying drawing, and to the letters and figures of reference marked thereon.

The present application is a division of my prior case, Serial No. 353,247, filed May 26, 1890.

My invention relates to improvements in electric motors, and particularly to that class of motors in which the field-magnets are energized by a continuous current and the armature is energized by induced currents. The armature is wound with a continuous or closed circuited winding connected from point to point by permanent conductors, which serve to localize the poles produced by the current. The armature so constructed revolves in an induction-coil, which is energized by a pulsating or rising-and-falling current of constant polarity, the rise and fall of which produces inductional effects upon the closed circuits upon the armature. This pulsating current is in the present instance obtained from a generator of the well-known continuous current type in the following or equivalent manner: A collector-ring is fixed to revolve concentrically with the commutator of the generator, but is carefully insulated from all but a single segment thereof, to which it is electrically connected. A collector-brush bears upon this ring, and to it is attached the conductor, which leads to one terminal of the induction-coil surrounding the armature of the motor. The other terminal of this coil is attached to the conductor leading to either the positive or negative brush of the generator. In the drawing, the return from the induction-coil is shown as being connected to the conductor leading to the negative brush of the generator; but it is obviously immaterial whether it be so connected or be connected to the conductor leading to the positive brush, except as it affects the direction in which the current will flow in the induction-coil.

The field-magnet coils of the motor are energized by currents obtained from the main, positive, and negative brushes of the generator.

In the drawing, M is a generator having an armature of the well-known Gramme-ring type, and M' is a motor of the double-field type, the armature A' of which is provided with a closed circuit-winding $a'$, connected at intervals by conductors $a^2$. (Shown in dotted lines.)

$B^2 B^3 B^4 B^5$ are the field-magnet cores, which are magnetized by the coils $C' C^2 C^3 C^4$, which are arranged in series and supplied with current of constant polarity from the main positive and negative brushes F F' of the generator M through conductors 1 and 2.

An induction-coil I surrounds the armature A' of the motor M' and is supplied with current through conductor 3 and supplemental brush G upon the ring R of generator M, the return being through conductor $2^a$ to a junction with main return 2.

Upon rotation of the armature A of the generator M current of constant polarity will flow from positive brush F through conductor 1, field-magnet coils $C' C^2 C^3 C^4$, and conductor 2 to negative brush F. At the same time a pulsating current of constant polarity will be supplied at every rotation of the armature A to the induction-coil I through collector-ring R, brush G, and conductor 3. This current will be of constant polarity, for the reason that the return from the induction coil or coils I is connected to the main return leading to the negative brush F' of the generator M, and as the segment of the commutator C, which supplies current to the ring R, approaches the said negative brush the polarity of conductor 3 will also be negative. There will then, therefore, be no operative current flowing through induction-coil I. This pulsation of the current of constant polarity will by induction create poles in the core of the armature A' at right angles to the poles of the field-magnets $B^2 B^3 B^4 B^5$ in accordance with the speed of revolution of the armature A of generator M, thus causing rotation of the armature A' of the motor M'.

The direction of rotation may be reversed by either reversing the polarity of the field-magnets of the armature induction-coils. For this purpose I have shown a reversing-switch S in the circuit of the induction-coil I and a similar switch S' in the circuit of the field-magnets.

It will be understood that I do not confine myself to the exact form of apparatus herein shown and described, and that many modifications of this construction might be made without departing from the spirit of my invention.

Having described my invention, what I claim, and desire to secure by Letters Patent, is—

1. The combination, with a source of continuous and pulsating currents, of a motor having a closed circuited armature encompassed by an inducing-coil in circuit with the source of pulsating current and field-magnets of constant polarity reacting upon the poles induced in the armature.

2. The combination, with a generator adapted to deliver continuous and pulsating currents, of a motor in circuit therewith, the field-magnets of which are of constant polarity, the armature of said motor being wound with a closed circuited coil, said armature being encompassed by an inducing-coil energized by the pulsating current derived from the generator, and means for reversing the direction of current flowing in the induction-coil.

3. The combination, with a generator adapted to deliver continuous and pulsating currents, of a motor in circuit therewith, the field-magnets of which are of constant polarity, the armature of said motor being wound with a closed circuited coil, said armature being encompassed by an inducing-coil energized by the pulsating current derived from the generator, and means for reversing the direction of current flowing in the field-coils.

4. The combination, with a source of continuous and pulsating currents of constant polarity, of a motor having its field-magnets excited by the continuous current, the armature of said motor being wound with a closed circuited coil and cross-connected at regular intervals, and an induction-coil encompassing the armature and energized by the said pulsating current.

In testimony whereof I affix my signature in presence of two witnesses.

CHARLES J. VAN DEPOELE.

Witnesses:
JOHN W. GIBBONEY,
CHAS. H. OLIN.